US007937582B1

(12) United States Patent
Lee

(10) Patent No.: US 7,937,582 B1
(45) Date of Patent: May 3, 2011

(54) SECURE XML FEEDS

(75) Inventor: Bob Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 934 days.

(21) Appl. No.: 11/425,599

(22) Filed: Jun. 21, 2006

(51) Int. Cl.
*G06F 21/00* (2006.01)
*G06F 21/20* (2006.01)
*G06F 21/24* (2006.01)

(52) U.S. Cl. ............ 713/155; 726/2; 726/3; 726/26; 726/28; 709/218; 709/229

(58) Field of Classification Search ............ 713/155
See application file for complete search history.

(56) References Cited

U.S. PATENT DOCUMENTS

| | | | |
|---|---|---|---|
| 2001/0021926 A1* | 9/2001 | Schneck et al. ............... 705/54 |
| 2002/0005867 A1* | 1/2002 | Gvily ............... 345/760 |
| 2002/0156905 A1* | 10/2002 | Weissman ............... 709/229 |
| 2004/0254958 A1* | 12/2004 | Volk ............... 707/104.1 |
| 2004/0268154 A1* | 12/2004 | Ullrich ............... 713/202 |
| 2005/0060372 A1* | 3/2005 | DeBettencourt et al. ..... 709/206 |
| 2005/0198299 A1* | 9/2005 | Beck et al. ............... 709/226 |
| 2005/0267973 A1* | 12/2005 | Carlson et al. ............... 709/228 |
| 2006/0155698 A1* | 7/2006 | Vayssiere ............... 707/6 |
| 2006/0173985 A1* | 8/2006 | Moore ............... 709/223 |
| 2006/0184617 A1* | 8/2006 | Nicholas et al. ............... 709/203 |
| 2007/0094365 A1* | 4/2007 | Nussey et al. ............... 709/223 |

OTHER PUBLICATIONS

Don E. Descy, All Aboard the Internet: Introducing RSS: Your one stop for news and information!, May 2004, TechTrends, vol. 49 No. 3, pp. 4-6.*

* cited by examiner

*Primary Examiner* — Taghi T Arani
*Assistant Examiner* — Kenneth Chang
(74) *Attorney, Agent, or Firm* — Harrity & Harrity, LLP

(57) ABSTRACT

A system receives an Extensible Markup Language (XML) feed, where the XML feed includes a reference to secure content. The system downloads secure content from a remote location based on the reference included in the XML feed.

28 Claims, 9 Drawing Sheets

SECURE XML FEEDS

BACKGROUND

1. Field of the Invention

Implementations described herein relate generally to data exchange and, more particularly, to providing secure feeds of data.

2. Description of Related Art

Extensible Markup Language (XML) is a simple, very flexible text format originally designed to meet the challenges of large-scale electronic publishing. XML is playing an increasingly important role in the exchange of a wide variety of data on the World Wide Web (WWW). XML creates common information formats and shares both the format and the data on the World Wide Web, intranets, and elsewhere. A number of XML formats have been designed, including Really Simple Syndication (RSS) and Atom.

Really Simple Syndication (RSS) is a lightweight XML format designed for sharing headlines and/or other Web content between sites. RSS includes a family of XML file formats for web syndication used, for example, by news websites and weblogs ("blogs"). The technology of RSS allows Internet users to subscribe to websites, whose content typically changes regularly, that provide RSS feeds. To use this technology, site owners create or obtain specialized software (e.g., a content management system) which, in the machine-readable XML format, presents new content in a list, giving a line or two of text from each item of content. The RSS formats provide web content or summaries of web content. This information is delivered as an XML file called an XML feed, RSS feed, webfeed, RSS stream, or RSS channel. In addition to facilitating syndication, RSS allows a website's frequent readers to track updates on the site using an aggregator.

SUMMARY

According to one aspect, a method may include receiving Extensible Markup Language (XML) feed data from an XML feed provider, where the XML feed data includes a reference to secure content. The method may further include sending authentication data to a network location associated with the reference and receiving secure content from the network location based on the user authentication data.

According to another aspect, a method may include sending an Extensible Markup Language (XML) feed, containing a reference to secure content, to an XML aggregator. The method may further include receiving a request for the secure content from the XML aggregator and sending an authentication request to the XML aggregator. The method may also include receiving authentication data from the XML aggregator and uploading the secure content to the XML aggregator based on the authentication data.

According to a further aspect, a method may include receiving an Extensible Markup Language (XML) feed, where the XML feed includes a reference to secure content. The method may further include downloading secure content from a remote location based on the reference included in the XML feed.

According to an additional aspect, a method may include sending an Extensible Markup Language (XML) feed, that relates to secure content and contains a reference to the secure content, to an XML aggregator. The method may further include receiving authentication data associated with a user desiring access to the secure content and uploading the secure content to a client associated with the user based on the authentication data.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Consistent with aspects of the invention, XML feeds of secure, private or sensitive content is provided to users. An XML feed, consistent with principles of the invention, may include un-secure content and an associated link (e.g., a Uniform Resource Locator (URL) associated with the network location at which the secure content is stored) to secure content. Upon receipt of the XML feed, the XML aggregator or client may extract the link from the XML feed and transmit a request to the link requesting a download of the secure content. The XML aggregator may additionally transmit authentication data to the link. Based on the download request, and possibly the authentication data, the XML aggregator or client may receive the download of the secure content from the network location associated with the link.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

OVERVIEW

Figure 1:
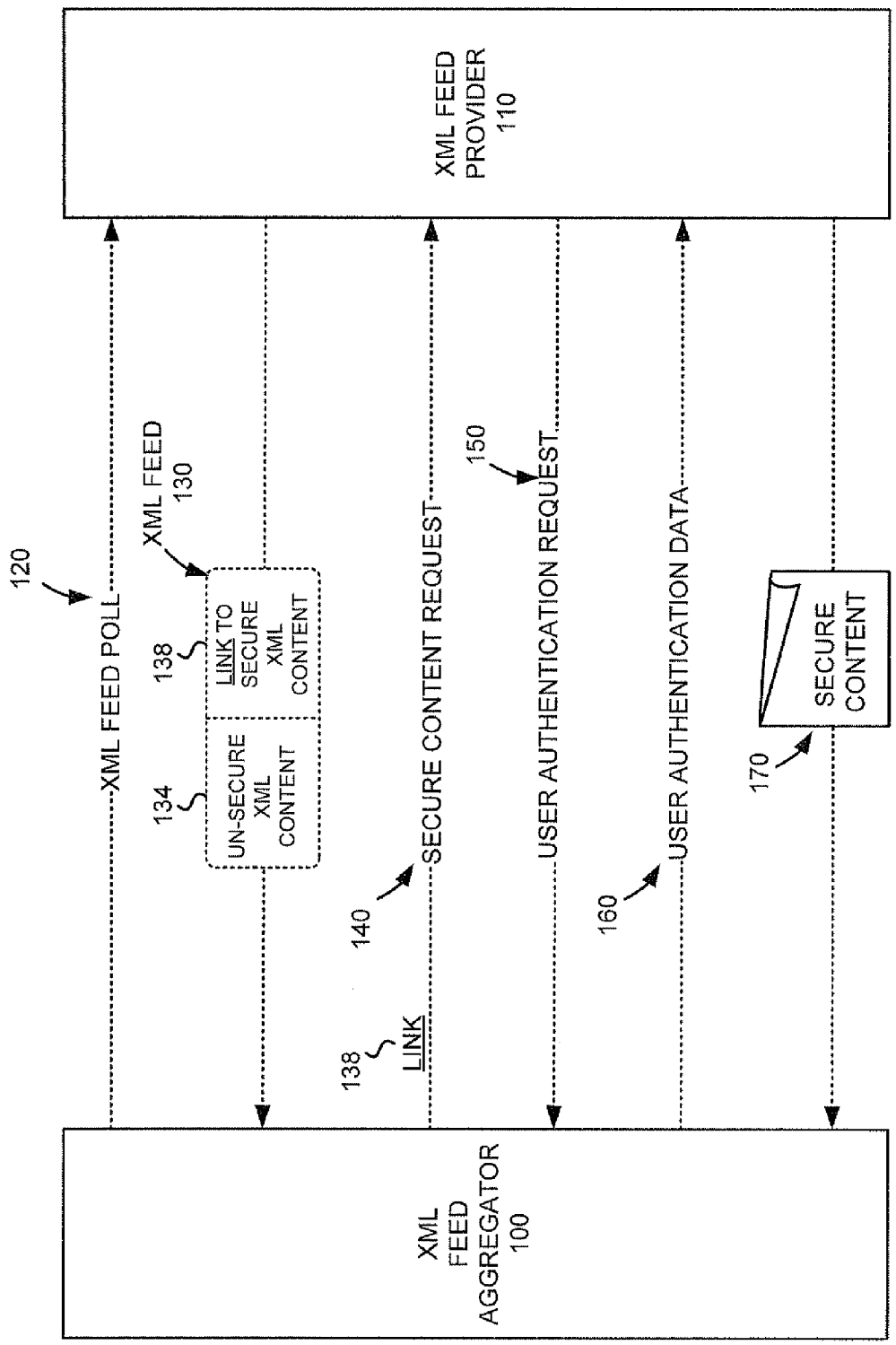
FIG. 1 is an exemplary diagram of an overview of an implementation of the invention.

FIG. 1 illustrates an exemplary overview of an implementation of the invention that provides a secure XML feed to a XML feed aggregator 100 from an XML feed provider 110. In the implementation illustrated in FIG. 1, XML feed provider 110 requires authentication prior to secure content being sent to XML feed aggregator 100.

To receive content via an XML feed, XML feed aggregator 100 first sends an XML feed poll 120 to XML feed provider 110 to determine whether XML feed provider 110 is storing new, or changed, content. If XML feed provider 110 is storing new, or changed, content, XML feed provider 110 transmits an XML feed 130 to XML feed aggregator 100. XML feed 130 may include un-secure XML content 134 and a link 138 to secure XML content. The un-secure content may include any type of content which is not considered by an operator of XML feed provider 110 as secure, private or sensitive. In one implementation, un-secure XML content 134 includes information (e.g., a snippet) associated with the secure XML content. The link 138 to secure content may include any type of reference to stored content that is considered by an operator of XML feed provider 110 as secure, private or sensitive. Link 138 may include, for example, a URL associated with a network location at which the secure content is stored. The secure content may include any type of content, such as, for example, a digital image, text, text and digital image, a video file, etc. XML feed aggregator 100 may present the un-secure content of the XML feed 130 to a user (not shown).

After receiving XML feed 130, XML feed aggregator 100 may use the link 138 contained in XML feed 130 to transmit a secure content request 140 to XML feed provider 110. The secure content request 140 may be sent in response to the user at XML feed aggregator 100 selecting an image element associated with the secure content from a display of XML feed data (not shown). In response to the secure content request, XML feed provider 110 may send a user authentication request 150 to the link 138 associated with the network location at which the secure content is stored. The user authentication request may request that the user at XML feed aggregator 100 provide user data that will authenticate the user.

In response to user authentication request 150, XML feed aggregator 100 obtains data 160 that authenticates the user (e.g., by having the user enter identification information, such as a username and password). XML feed aggregator 100 then sends user authentication data 160 to XML feed provider 110. After receiving user authentication data 160 that corresponds to the secure content request 140, and validation of the user authentication data, XML feed provider 110 may transmit the secure content 170 to XML feed aggregator 100. Secure content 170 may include any type of secure, private or sensitive data, including, for example, textual data, image data, etc. As one example, in Google AdWords, secure content 170 may include a campaign summary (e.g., a spreadsheet-like table of text) associated with a user's ad campaign that is hosted by Google. Secure content 170 may, in some implementations, only be accessible to users who pay for the access (e.g., subscribers). Thus, consistent with some implementations of the invention, user authentication data only has to be supplied to XML feed provider 110 at the time that XML feed aggregator 100 attempts to render secure XML content (e.g., when the user at XML feed aggregator 100 selects the image element associated with the secure content) or to render the un-secure XML content associated with the secure XML content.

Exemplary Network Configuration

Figure 2:
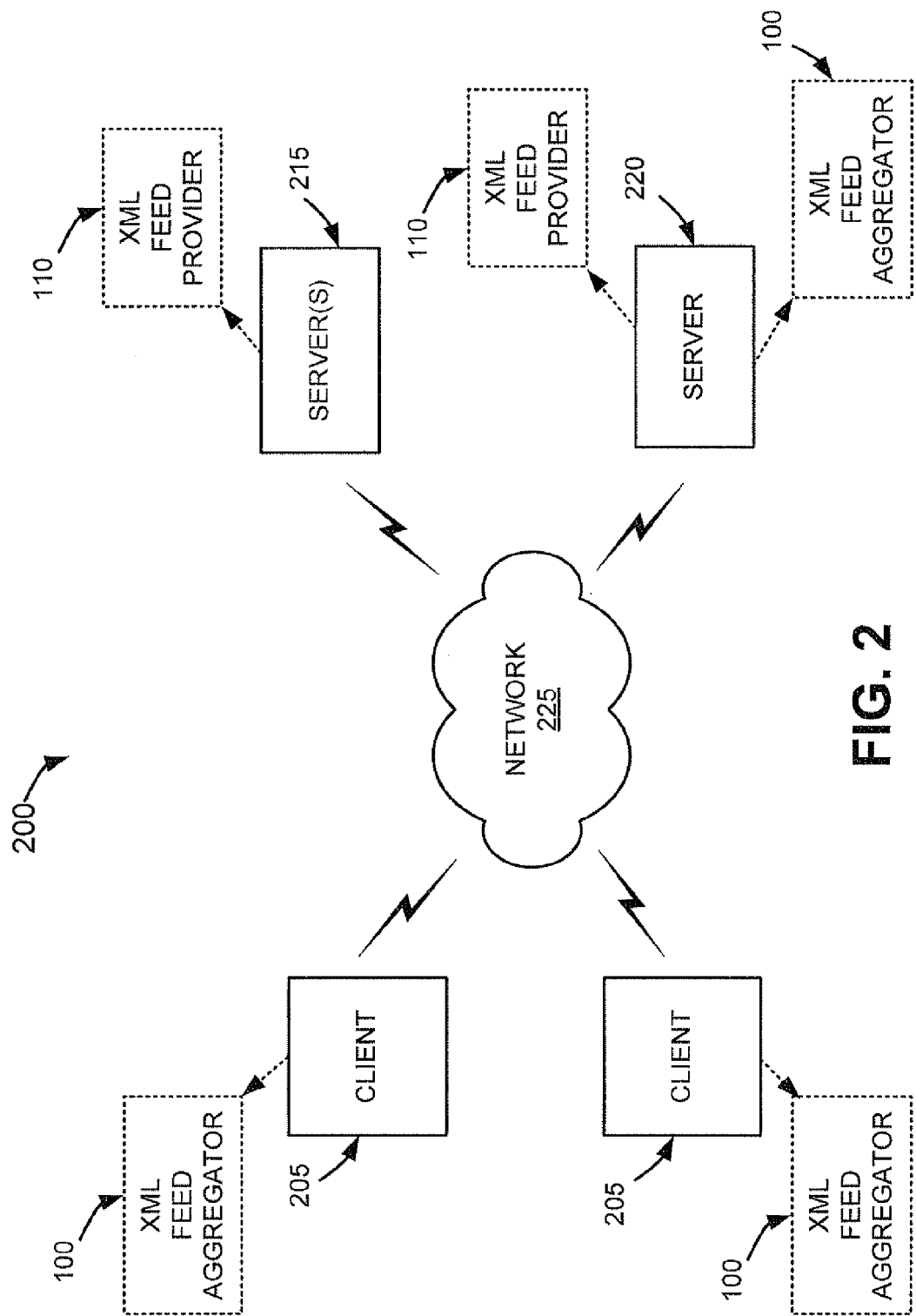
FIG. 2 is an exemplary diagram of a network in which systems and methods consistent with principles of the invention may be implemented.

FIG. 2 is an exemplary diagram of a network 200 in which systems and methods consistent with the principles of the invention may be implemented. Network 200 may include multiple clients 205 connected to one or more servers 215 or 220 via a network 225. Two clients 205 and two servers 215 and 220 have been illustrated as connected to network 225 for simplicity. In practice, there may be more or fewer clients and servers. Also, in some instances, a client may perform one or more functions of a server and a server may perform one or more functions of a client.

Clients 205 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Clients 205 may implement XML feed aggregators 100 that retrieve portions of stored document content (e.g., syndicated web content) from an XML feed provider 110 that is supplied in the form of a web feed (e.g., RSS, Atom, or other XML formats), and that are published, for example, by blogs, podcasts, vlogs, mass media websites, etc. XML feed aggregators 100 may include desktop aggregators (e.g., News Reader, NetNewsWire, FeedDemon, Fuzzy Duck, Liferea, FeedReader) or "built-in" aggregators (e.g., Safari, Opera Web Browser, Mozilla Thunderbird, Mozilla Firefox, Internet Explorer 7, My RSS Toolbar, Google Toolbar) that can receive and aggregate XML feeds from XML feed provider 110 for presentation to users.

Server(s) 215 may include one or more server entities that store, update, and maintain document content. Such content may include data related to published news stories, products, images, or any other type of data that may be published by blogs, podcasts, vlogs, mass media websites, etc. For example, server(s) 215 may store, update or maintain news stories from any type of news source, such as, for example, the Washington Post, the New York Times, Time magazine, or Newsweek. As another example, server(s) 215 may store, update, or maintain data related to specific products, such as product data provided by one or more product manufacturers. As yet another example, server(s) 215 may store, update, or maintain data related to other types of web documents, such as pages of web sites. Furthermore, server(s) 215 may store documents having any type of data content (e.g., daily ad spending to an advertiser advertising on Google AdWords, stock prices, back links to a web site, security warnings when a user tries and fails to log onto a web site too many times, code submissions to a source control system, etc.) that may also be provided as an XML feed by XML feed provider 110. Server(s) 215 may include, or have associated with it, a XML feed provider 110. XML feed provider 110 may provide XML feeds (e.g., in RSS, Atom, or other XML formats), containing portions of stored document content, to XML feed aggregators 100. Only one server 215 and XML feed provider 110 is shown in FIG. 2 for illustrative purposes. Network 200 may, however, include multiple servers 215 with their associated XML feed providers 110.

Server 220 may include a server entity that can store or maintain portions of documents aggregated by an associated XML feed aggregator 100. XML feed aggregator 100, associated with server 220, may retrieve portions of stored document content (e.g., syndicated web content) from one or more XML feed providers 110 associated with one or more servers 215 that is supplied in the form of an XML feed (e.g., RSS, Atom, or other XML formats). XML feed aggregator 100, associated with server 220, may, thus, aggregate XML feeds from multiple different XML feed providers 110. XML feed aggregator 100, associated with server 220, may include a web based aggregator (e.g., NewsIsFree, BlogLines, Hyper-Super, Rojo, AlmondRocks, NewsGator, Xprssit, Newsvine) that aggregates XML feeds and permits users at clients 205 to access and read them in their browsers. XML feed aggregator 100, associated with server 220, may further include email based aggregators that aggregate XML feeds and permit users at clients 205 to receive the content of the feeds in their email clients. Server 225 may further include its own XML feed provider 110 for feeding aggregated XML feed data to clients 205.

Clients 205 and servers 215 and 220 may connect to network 225 via wired, wireless, and/or optical connections. While servers 215 and 220 are shown as separate entities, it may be possible for one of servers 215 or 220 to perform one or more of the functions of the other one of servers 215 or 220. For example, it may be possible that servers 215 and 220 are implemented as a single server. It may also be possible for a single one of servers 215 and 220 to be implemented as two or more separate (and possibly distributed) devices.

Network 225 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

Exemplary Client/Server Architecture

Figure 3:
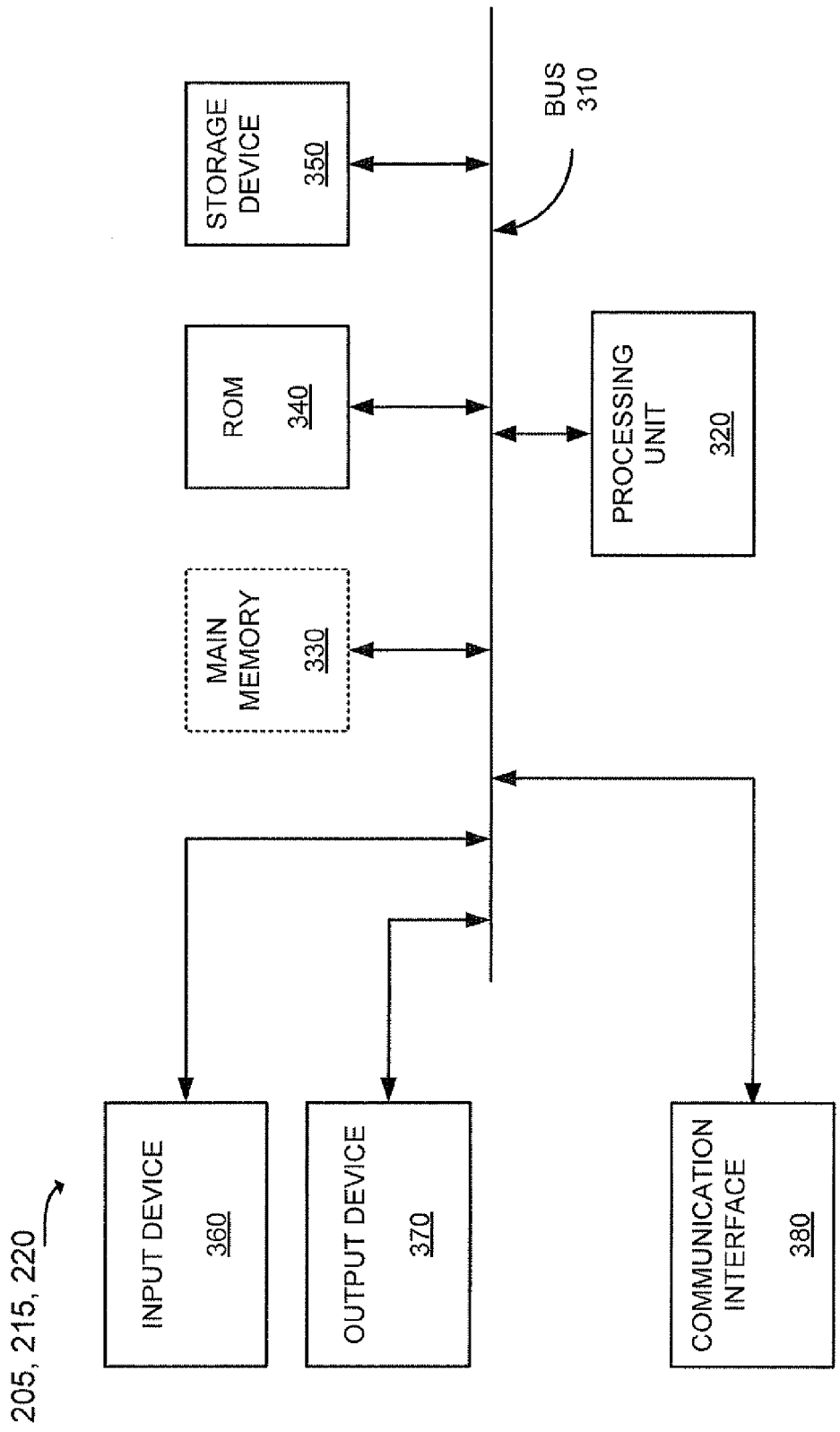
FIG. 3 is an exemplary diagram of a client or server of FIG. 2 according to an implementation consistent with principles of the invention.

FIG. 3 is an exemplary diagram of a client or server entity (hereinafter called "client/server entity"), which may correspond to one or more of clients 205 and/or servers 215 or 220, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 225.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with principles of the invention are not limited to any specific combination of hardware circuitry and software.

Exemplary XML Aggregator Secure Feed Process

Figure 4A:
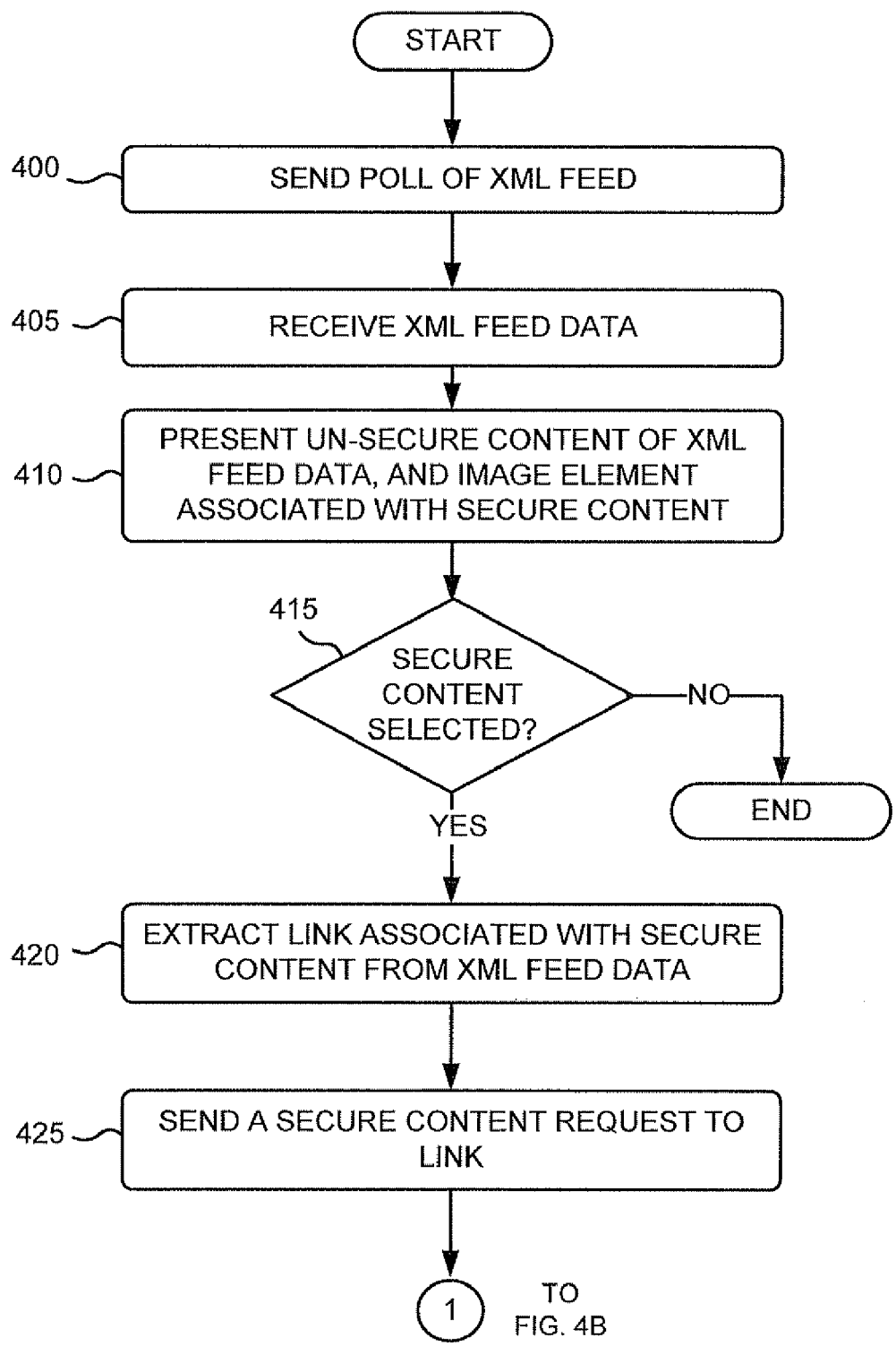
FIGS. 4A through 4B are a flowchart of an exemplary process for receiving a secure XML feed at an XML feed aggregator consistent with principles of the invention.
Figure 4B:
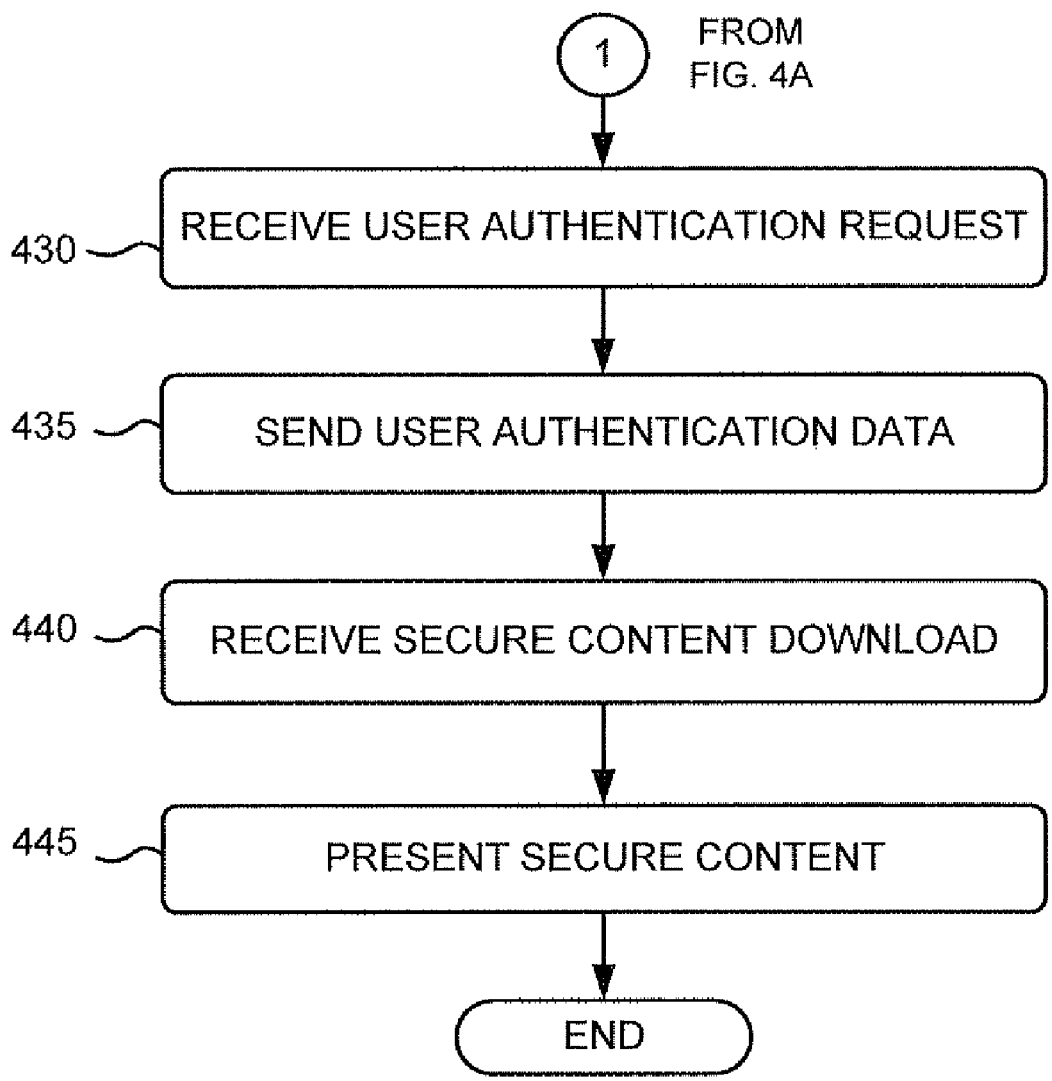

FIGS. 4A and 4B are a flowchart of an exemplary process for receiving a secure XML feed at an XML feed aggregator 100 consistent with principles of the invention. The process exemplified by FIGS. 4A and 4B may be performed by an XML feed aggregator 100 at a client 205 or server 220.

Figure 5:
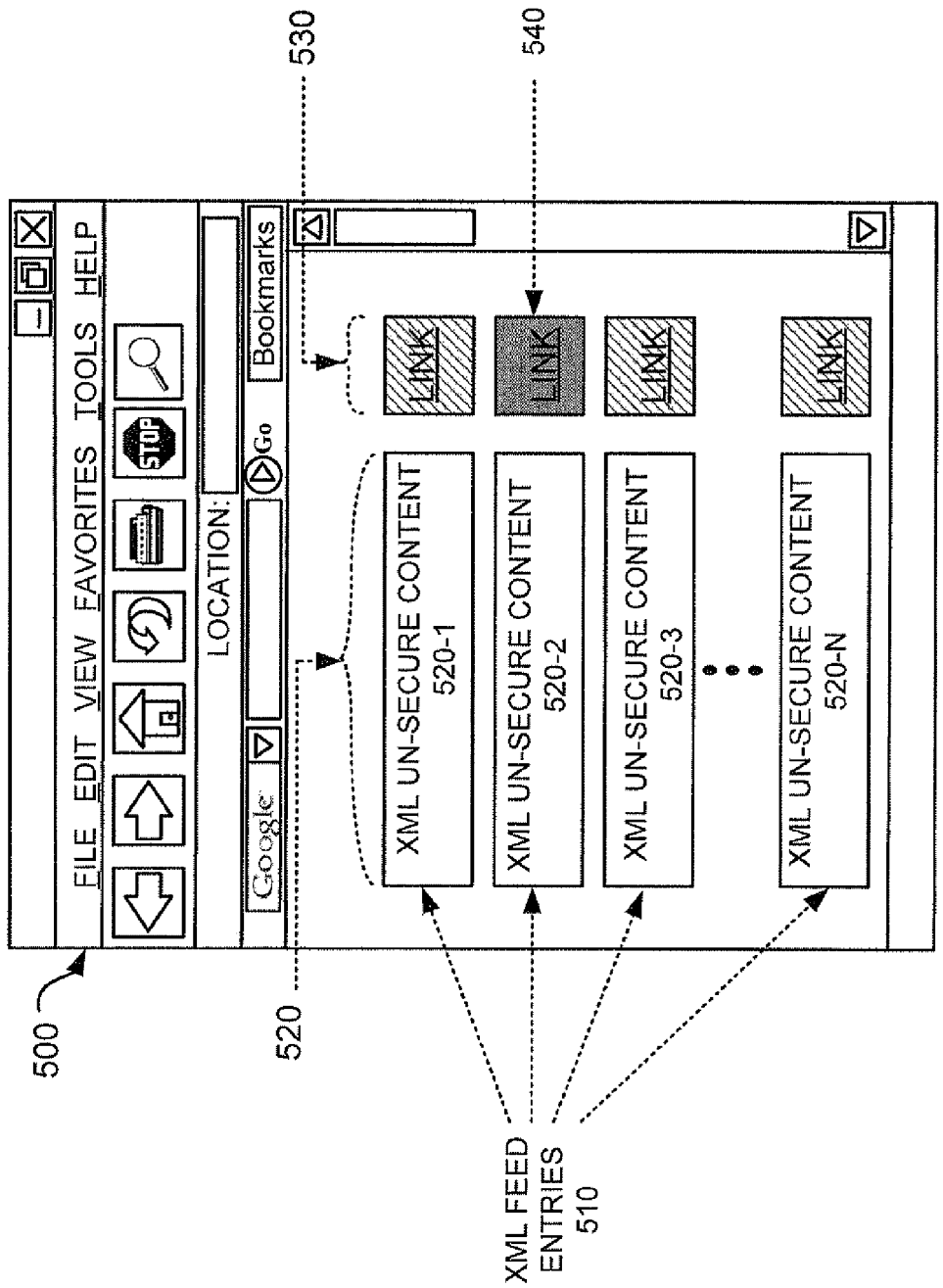
FIG. 5 is a diagram of un-secure content of XML feed entries being presented at an XML feed aggregator consistent with principles of the invention.

The exemplary process may begin with XML feed aggregator 100 sending a poll 120 of the XML feed to XML feed provider 110 (block 400). In one implementation, an XML feed aggregator 100 at client 205 may send a poll 120 to an XML feed provider 110 at server 220. In another implementation, an XML feed aggregator 100 at client 205 may send a poll to an XML feed provider 110 at server 215. In a further implementation, an XML feed aggregator 100 at server 220 may send a poll 120 to an XML feed provider 110 at server 215. In response to the poll, XML feed aggregator 100 may receive XML feed data 130 back from XML feed provider 110 (block 405). The XML feed data 130 may include un-secure content 134 and a link 138 to secure content. XML feed aggregator 100 may present the un-secure content of the XML feed data, and an image element associated with secure content, to a user (block 410). For example, as illustrated in FIG. 5, XML content may be presented to a user in a browser 500, or other software application. The XML content may be presented as multiple XML feed entries 510, each of which includes un-secure content 520 and a corresponding image element 530. Un-secure content 520 may include, for example, a snippet (e.g., a portion) of data. Each image element 530 may indicate that secure, sensitive or private XML content has not been presented, but is available for access by the user if the user can authenticate. In some implementations, image element 530 may include a snippet of the secure content, plain text rendered as an image, a normal image (e.g., a graph), etc. Image element 530 may also include any type of data that serves to indicate that secure, sensitive or private XML content has not been presented, but is available for access by the user if the user can authenticate.

Figure 6:
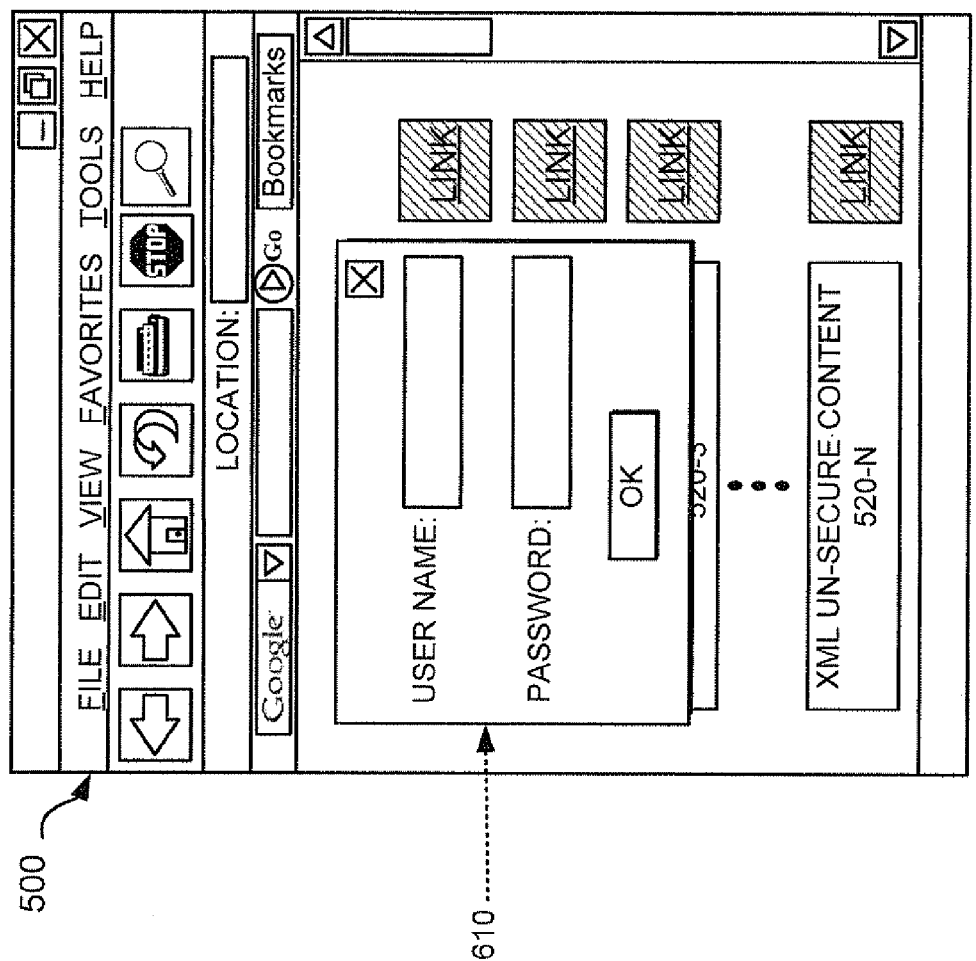
FIG. 6 is a diagram that illustrates user authentication prior to provision of the secure XML content to an XML feed aggregator consistent with principles of the invention.

XML feed aggregator 100 may determine if the user has selected the secure content (block 415). For example, as shown in FIG. 5, a user may select 540 (e.g., "click" on with a mouse) an image element 530 that corresponds to the secure content that the user desires to access. If the user has selected secure content, a link associated with the secure content may be extracted from the XML feed data (block 420). The link may further be associated with the XML feed provider 110 that may provide the secure content, or with another entity or network location where the secure content is stored. The link may include, for example, a URL associated with the network location at which the secure content is stored. XML aggregator 100 may send a secure content request to the extracted link (block 425). In response to the secure content request, XML feed aggregator 100 may receive a user authentication request (block 430). XML feed provider 110, or an entity associated with the extracted link, may send the user authentication request to XML aggregator 100 via network 225 in response to receipt of the secure content request. In response to receipt of the user authentication request, XML feed aggregator 100 may present a user authentication window 610 to the user, as illustrated in FIG. 6. The user authentication window 610 may request user authentication data from the user, such as, for example, the user's user name and password.

Figure 7:
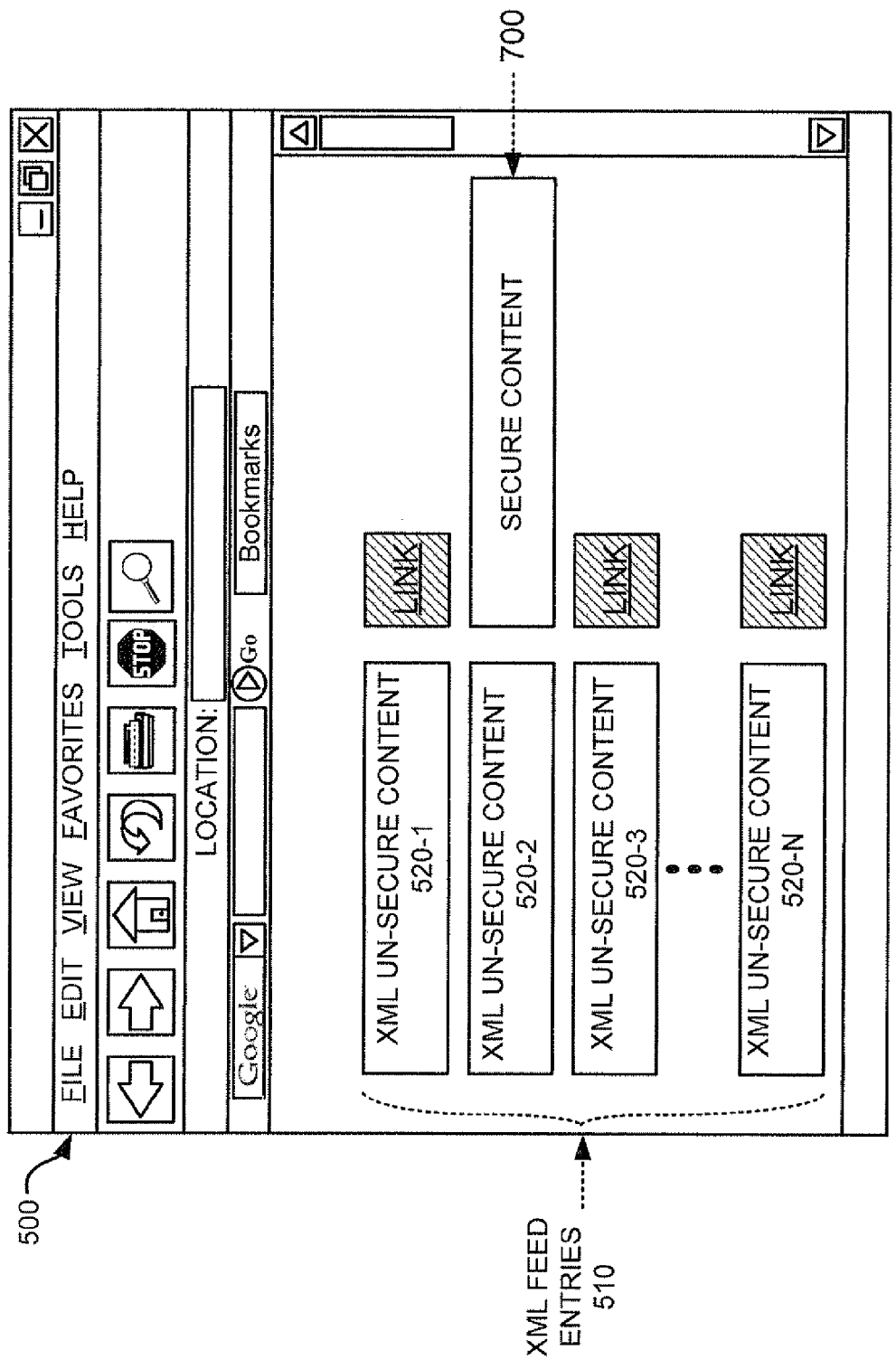
FIG. 7 is a diagram of XML un-secure content and selected secure content being presented at an XML feed aggregator consistent with principles of the invention.

XML feed aggregator 100 may then send the user authentication data (block 435). XML feed aggregator 100 may send the user authentication data to XML feed provider 110, or an entity associated with the extracted link, via network 225. XML feed aggregator 100 may then receive a secure content download (block 440). The secure content may be received from XML feed provider 110, or from an entity associated with the extracted link. XML feed aggregator 100 may present the secure content to a user (block 445). As illustrated in FIG. 7, the received secure content 700 may be displayed to the user along with its corresponding un-secure content 520-2. Therefore, consistent with aspects of the invention described above, XML feed aggregator 100 does not "see" the secure content (e.g., the secure content is not provided to XML feed aggregator 100) until user authentication data is first supplied to XML feed provider 110.

Exemplary XML Feed Provider Process

Figure 8:
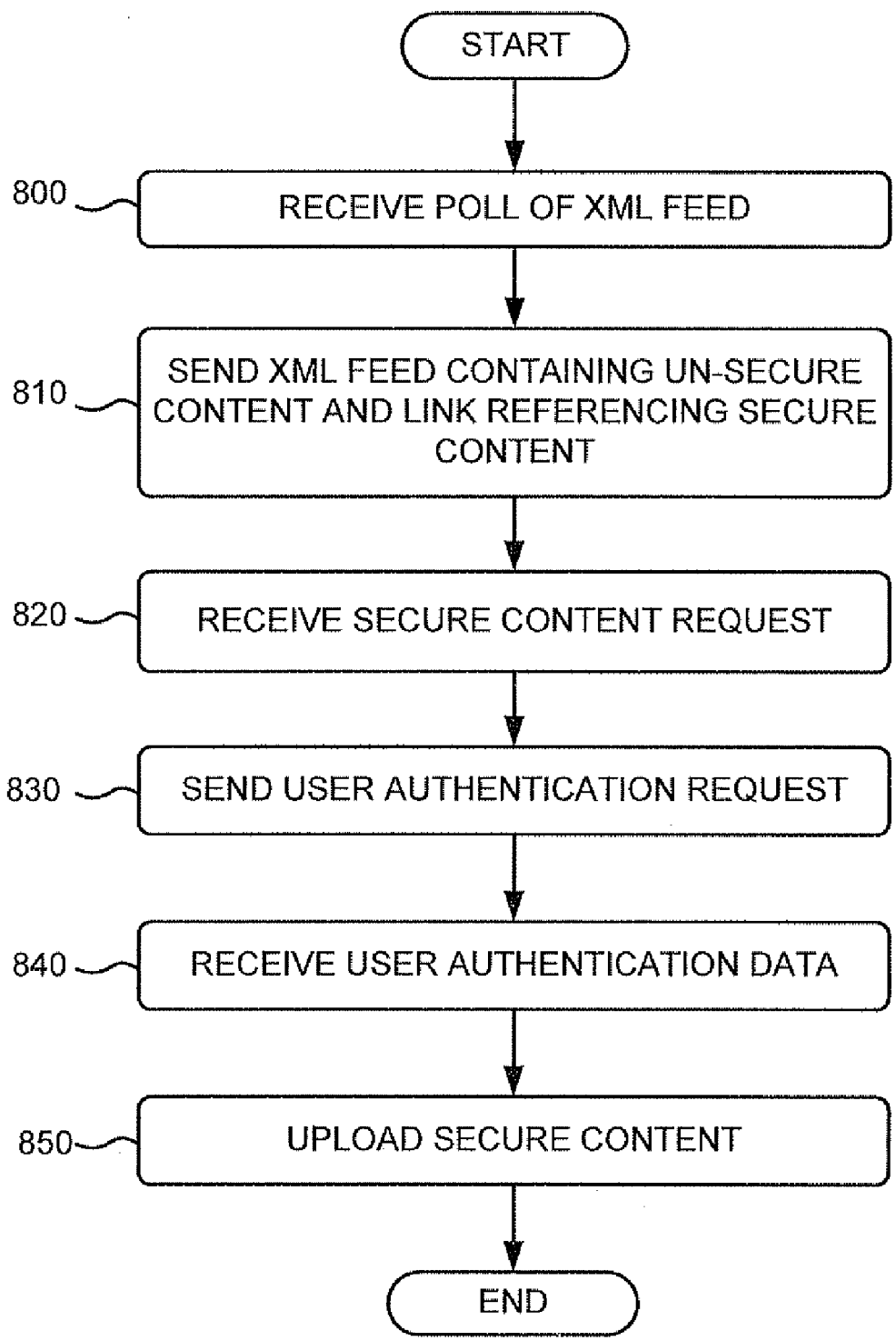
FIG. 8 is a flowchart of an exemplary process for authenticating a user and providing secure content to the user subsequent to user authentication.

FIG. 8 is a flowchart of an exemplary process for feed authentication at XML feed provider 110 and for providing secure content based on the authentication. The process exemplified by FIG. 8 may be performed by XML feed provider 110 at server 215, by an XML feed provider 110 at server 220, or in conjunction with another entity separate from servers 215 or 220.

The exemplary process may begin with XML feed provider 110 receiving a poll 120 of the XML feed from XML feed aggregator 100 (block 800). XML feed provider 110 at server 215 or at server 220 may receive the poll 120. In response to the poll, XML feed provider 110 may send an XML feed 120 containing un-secure content 134 and also containing a link 138 referencing secure content (block 810). XML feed provider 110 may send the XML feed 130 to XML feed aggregator 100 at server 220, or to an XML feed aggregator 100 at a client 205.

XML feed provider 110, or an entity associated with the link 138, may receive a secure content request 140 from XML aggregator 100 (block 820) and may then send a user authentication request 150 to XML aggregator 100 (block 830). In response to the user authentication request 150, XML feed provider 110, or the entity associated with the link 138, may receive user authentication data 160 from XML feed aggregator 100 (block 840). XML feed provider 110, or the entity associated with the link 138, may, after ascertaining the validity of the user authentication data, upload secure content to XML feed aggregator 100 (block 850).

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 4A, 4B and 8, the order of the acts may be modified in other implementations consistent with the principles of the invention. Further, non-dependent acts may be performed in parallel. Aspects of the invention have been described as being applicable to XML feeds. The principles of the invention as described herein may also be applied to the use of proprietary notification clients or email.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   receiving, by the one or more server devices, Extensible Markup Language (XML) feed data from an XML feed provider, where the received XML feed data includes unsecure content and a reference to secure content;
   presenting, by the one or more server devices and in a web document, the unsecure content and the reference to the secure content, the reference to the secure content being presented at a first location in the web document;
   sending, to the XML feed provider and by the one or more devices, a request, from a user device, for the secure content;
   receiving, from the XML feed provider and by the one or more server devices, an authentication request in response to sending the request for the secure content;
   sending, by the one or more server devices, authentication data to the XML feed provider, in response to receiving the authentication request,
   where the authentication data uniquely identifies a user of the user device;
   receiving, by the one or more server devices, the secure content from the XML feed provider based on the authentication data; and
   presenting, by the one or more server devices and in the web document, the received secure content,
   where the received secure content replaces the reference to the secure content at the first location in the web document.

2. The method of claim 1, where sending the authentication data to the XML feed provider is based on detecting selection, by the user device, of the reference to the secure content.

3. The method of claim 1, where the reference comprises a link.

4. The method of claim 3, where the link comprises a Uniform Resource Locator (URL) associated with a network location of the secure content.

5. The method of claim 1, where the authentication data comprises a username and password associated with the user, and
where receiving the secure content includes:
receiving the secure content based on the username and password associated with the user.

6. The method of claim 1, further comprising:
receiving second XML feed data from the XML feed provider, where the second XML feed data includes second, different unsecure content and a second, different reference to second, different secure content;
presenting, in the web document, the second unsecure content and the second reference to the second secure content, the second reference being presented at a second, different location in the web document;
sending second, different authentication data to a network location, associated with the second reference, to request the second secure content, where the XML feed provider is associated with a first server and the network location is associated with an entity different than the first server;
receiving the second secure content from the network location based on the second user authentication data and
presenting, in the web document, the second unsecure content and the second secure content, the second secure content replacing the second reference at the second location.

7. The method of claim 6, further comprising:
sending a request for the second secure content to the network location; and
receiving a second authentication request from the network location based on the request for the second secure content,
where sending the second authentication data is based on receiving the second authentication request.

8. The method of claim 1, where presenting the unsecure content and the reference to the secure content includes:
presenting, in the web document, the un-secure content and an image element associated with the reference to the secure content, at the first location,
where the image element corresponds to the secure content rendered as an image, and
where presenting the received secure content includes:
replacing the image element with the received secure content based on detecting selection of the image element.

9. A method performed by one or more server devices, the one or more server devices implementing an Extensible Markup Language (XML) feed provider, the method comprising:
receiving, at the one or more server devices, a poll for at least one of new content or a change to existing content;
sending, from the one or more server devices, when the at least one of new content or change to existing content is stored, an XML feed, including a reference to secure content, to an XML aggregator, in response to receiving the poll, the reference to the secure content being presented, to a user device, at a first location in a web document;
receiving, at the one or more server devices, a request for the secure content from the XML aggregator;
sending, from the one or more server devices, an authentication request to the XML aggregator, in response to receiving the request for the secure content from the XML aggregator;
receiving, at the one or more server devices, authentication data from the XML aggregator, in response to sending the authentication request,
where the authentication data uniquely identifies a user of the user device requesting access to the secure content; and
uploading, by the one or more server devices, the secure content to the XML aggregator, based on the authentication data, and in response to receiving the authentication data from the XML aggregator, the uploaded secure content replacing the reference to the secure content at the first location in the web document.

10. The method of claim 9, where the XML feed further includes un-secure content, and
where the un-secure content is presented, to the user device, at a second, different location in the web document.

11. The method of claim 9, where the authentication data comprises at least one of a user name or password associated with the user, and
where the uploading includes:
uploading the secure content to the XML aggregator, based on the at least one of the user name or the password associated with the user, and in response to receiving the at least one of the user name or the password associated with the user.

12. The method of claim 10, where the reference includes a link.

13. The method of claim 12, where the link comprises a Uniform Resource Locator (URL) associated with a network location at which the secure content is stored.

14. A method performed by one or more devices, the one or more devices implementing an Extensible Markup Language (XML) aggregator, the method comprising:
receiving, by the one or more devices, an XML feed, where the XML feed includes un-secure content and a reference to secure content;
presenting, to a user device and in a web document, and by the one or more devices, the un-secure content and an image element associated with the reference to the secure content, the image element being presented at a first location in the web document;
presenting, to the user device, and by the one or more devices, in response to detecting selection of the image element, an authentication window that allows for transmission of authentication information;
sending, by the one or more devices, user authentication data, received via the presented authentication window, to a remote network location associated with the reference,
where the user authentication data is associated with a user of the user device;
downloading, in response to sending the user authentication data, by the one or more devices, the secure content from a remote network location based on the reference included in the XML feed; and
presenting, by the one or more devices, to the user device and in the web document, the downloaded secure content along with the presented un-secured content, where the downloaded secure content replaces the presented image element at the first location.

15. The method of claim 14, where the image element is associated with a link corresponding to the remote network location.

16. A method performed by one or more server devices, the one or more server devices implementing an Extensible Markup Language (XML) feed provider, the method comprising:
sending, by the one or more server devices, an XML feed, that relates to secure content and contains un-secure content and a reference to the secure content, to an XML aggregator,
where the sending causes the un-secure content and an image element, associated with the reference to the secure content, to be presented to a client and in a web document at a first location;
sending, by the one or more server devices, an authentication request to the XML aggregator, where the authentication request causes the XML aggregator to present an authentication window to the client requesting access to the secure content;
receiving, by the one or more server devices, authentication data associated with a user that is associated with the client requesting desiring access to the secure content, in response to the sending the authentication request,
where the authentication data uniquely identifies the user; and
uploading, by the one or more server devices, the secure content to the client based on the received authentication data,
where the uploading causes the uploaded secure content to be presented to the client along with the presented un-secure content, the uploaded secure content replacing the image element at the first location.

17. The method of claim 16, where the authentication data comprises a username and password associated with the user, and
where the uploading comprises:
uploading the secure content to the client based on the username and the password associated with the user.

18. The method of claim 16, where the image element is associated with a Uniform Resource Locator (URL) corresponding to a network location at which the secure content is stored.

19. A system, comprising:
a plurality of first extensible markup language (XML) feed providers to:
receive a poll for at least one of new content or a change to existing content, and
transmit, in response to receiving the poll, when the at least one of new content or change to existing content is stored, a plurality of first XML feeds, where at least one of the plurality of first XML feeds includes un-secure data that relates to secure data and an associated link to the secure data;
a first XML feed aggregator, implemented on a first device, to receive the plurality of first XML feeds and aggregate the received plurality of first XML feeds;
a second XML feed provider, implemented on the first device, to transmit a second XML feed, where the second XML feed includes the un-secure data and the associated link to the secure data extracted from the at least one of the plurality of first XML feeds; and
a second XML feed aggregator to:
receive the second XML feed,
present, to a user device and in a web document, the un-secure data and an image element associated with the associated link to the secure data that is included in the second XML feed, the image element being presented at a first location in the web document,
send, in response to a request for the secure data, authentication data to the second XML feed provider, the authentication data being associated with a user of the user device,
download, from the second XML feed provider, the secure data using the associated link, based on the authentication data, and
present, to the user device and in the web document, the downloaded secure data along with the un-secured data included in the second XML feed, the downloaded secure data replacing the presented image element at the first location.

20. A system, comprising:
an Extensible Markup Language (XML) feed provider that includes:
means for receiving a poll for at least one of new content or a change to existing content;
means for sending an XML feed, containing a reference to secure data, to an XML aggregator, in response to receiving the poll, an image element, associated with the reference to the secure data, being presented at a first location in a web document;
means for receiving a request to secure data from the XML aggregator;
means for sending an authentication request to the XML aggregator, in response to receiving the request for the secure data, the request for the secure data being based on a detected selection of the image element;
means for receiving authentication data from the XML aggregator, in response to sending the authentication request,
where the authentication data uniquely identifies a user of a user device requesting access to the secure data; and
means for uploading the secure data to the XML aggregator based on a validity of the received authentication data, the uploaded secure data replacing the image element at the first location in the web document.

21. One or more non-transitory memory devices that store instructions executable by a processor, the instructions comprising:
one or more instructions to send, by an extensible markup language (XML) feed aggregator, a poll for at least one of new content or change to existing content;
one or more instructions to receive an XML feed that includes un-secure content relating to secure content and a link to the secure content, in response to sending the poll;
one or more instructions to present, to a user device and in a document, the un-secure content and the link to the secure content, the link to the secure content being presented at a first location in the document;
one or more instructions to determine, by the XML feed aggregator, whether the link to the secure content has been selected by the user device;
one or more instructions to send, by the XML feed aggregator, authentication data, based on a result of the determining,
where the authentication data uniquely identifies a user of the user device;
one or more instructions to download the secure content from a remote location using the link included in the XML feed, in response to sending the authentication data; and
one or more instructions to present, in the document, the un-secure content along with the downloaded secure content, the downloaded secure content replacing, at the first location in the document, the link to the secure content.

22. The one or more memory devices of claim 21, further comprising:
one or more instructions to determine that the link to the secure content has been selected; and
one or more instructions to extract the link to the secure content from the XML feed data based on the determining that the secure content has been selected.

23. The system of claim 19, where the first XML feed aggregator is further to:
present, to another user device and in the web document, a plurality of XML feed entries,
where at least one of the presented plurality of XML feed entries corresponds to one of the plurality of first XML feeds, and
where the at least one of the presented plurality of XML feed entries includes second, different un-secure data and a second, different image element, associated with second, different secure data and relating to the second un-secure data, the second image element including at least a portion of the second secure data rendered as an image and being presented at a second, different location in the web document.

24. The system of claim 23, where the first XML feed aggregator is further to send second, different authentication data to one of the plurality of first XML feed providers, based on selection of the second image element; and
where the one of the plurality of first XML feed providers is to:
receive the second authentication data,
validate the received second authentication data, and
upload the second secure data to the first XML aggregator, where the uploading causes the second image element to be replaced with the uploaded second secure data at the second location in the web document.

25. The system of claim 19, where the second XML feed aggregator is included in a second, different device, where one or more of the plurality of XML feed providers are included in one or more additional devices, and
where the second XML feed provider is further to:
determine a validity of the authentication data, and
send the secure data to the second XML aggregator when the authentication data is determined to be valid.

26. The method of claim 16, where uploading the secure content comprises:
validating, by the XML feed provider, the received authentication data,
where uploading the secure content is based on a result of the validating.

27. The one or more memory devices of claim 21, where the un-secure content includes a portion of data associated with the secure content.

28. The method of claim 14, further comprising:
receiving a second XML feed, where the second XML feed includes second un-secure content and a second, different reference to second, different secure content;
presenting, in the web document, the second un-secure content and a second, different image element associated with the second reference, the second image element being presented at a second, different location in the web document, the second image element including at least a portion of the second secure content rendered as an image;
sending authentication data based on detecting selection of the second image element;
downloading, in response to sending the authentication data, the second secure content; and
presenting, in the web document, the downloaded second secure content along with the presented un-secure content, where the downloaded second secure content replaces the presented second image element at the second location in the web document.

* * * * *

UNITED STATES PATENT AND TRADEMARK OFFICE
CERTIFICATE OF CORRECTION

PATENT NO.        : 7,937,582 B1                                                  Page 1 of 1
APPLICATION NO.   : 11/425599
DATED             : May 3, 2011
INVENTOR(S)       : Bob Lee It is certified that error appears in the above-identified patent and that said Letters Patent is hereby corrected as shown below:

Column 9, line 27 (Claim 6, line 17), after "data" insert -- ; --.

Column 9, line 44 (Claim 8, line 4), after "element" insert -- , --.

Column 11, line 24 (Claim 16, line 20), delete "desiring".

Signed and Sealed this
Twenty-eighth Day of June, 2011

David J. Kappos
*Director of the United States Patent and Trademark Office*